United States Patent
Reddy et al.

(10) Patent No.: US 7,322,025 B2
(45) Date of Patent: Jan. 22, 2008

(54) METHOD AND APPARATUS FOR VERSIONING AND CONFIGURATION MANAGEMENT OF OBJECT MODELS

(75) Inventors: Sreedhar Sannareddy Reddy, Pune (IN); Arun Gajanan Bahulkar, Pune (IN)

(73) Assignee: TATA Consultancy Services Limited (IN)

( * ) Notice: Subject to any disclaimer, the term of this patent is extended or adjusted under 35 U.S.C. 154(b) by 767 days.

(21) Appl. No.: 10/622,324

(22) Filed: Jul. 17, 2003

(65) Prior Publication Data

US 2004/0103393 A1 May 27, 2004

Related U.S. Application Data

(63) Continuation-in-part of application No. 10/059,696, filed on Jan. 28, 2002, now Pat. No. 6,904,588.

(30) Foreign Application Priority Data

Jul. 17, 2001 (IN) .................. 689/MUM/2001
Jul. 26, 2001 (IN) .................. 722/MUM/2001

(51) Int. Cl.
*G06F 9/44* (2006.01)
(52) U.S. Cl. .................. 717/121; 717/122; 717/107; 717/108; 717/105
(58) Field of Classification Search .................. 717/120, 717/121, 122, 107, 108, 104, 105, 162, 167; 707/203
See application file for complete search history.

(56) References Cited

U.S. PATENT DOCUMENTS 4,951,192 A * 8/1990 Chase et al. ................ 717/149

(Continued)

FOREIGN PATENT DOCUMENTS

IN 689/MUM/2001 7/2001

(Continued)

OTHER PUBLICATIONS

A. Zeller, "A Unified Version Model for Configuration Management", 1995, ACM, p. 151-160.*

(Continued)

*Primary Examiner*—Wei Zhen
*Assistant Examiner*—Qamrun Nahar
(74) *Attorney, Agent, or Firm*—Donald R. Boys; Central Coast Patent Agency, Inc.

(57) ABSTRACT

A tool for versioning and configuration management of object models in a computing system including a component container for grouping objects to form a component containing the objects, the objects having properties and associations and a configuration container for grouping the assembled components to form a configuration. Each component is assigned a version number upon creation whereupon subsequent versions, if any, of the component are derived directly or indirectly from an earlier version, the objects accessibly isolated within the assigned component versions except for inter-component associations established between compatible ones of the objects in separate but compatible components of the configuration, the associations forming the basis for assembling, managing and function of the configuration.

10 Claims, 9 Drawing Sheets

U.S. PATENT DOCUMENTS

| | | | | |
|---|---|---|---|---|
| 5,550,971 | A * | 8/1996 | Brunner et al. | 707/3 |
| 5,553,282 | A * | 9/1996 | Parrish et al. | 707/10 |
| 5,950,011 | A * | 9/1999 | Albrecht et al. | 717/167 |
| 6,487,713 | B1 * | 11/2002 | Cohen et al. | 717/105 |
| 6,871,344 | B2 * | 3/2005 | Grier et al. | 717/162 |
| 7,007,280 | B1 * | 2/2006 | Dermer | 719/316 |
| 7,073,170 | B2 * | 7/2006 | Grier et al. | 717/162 |
| 2004/0015822 | A1 * | 1/2004 | Linton et al. | 717/108 |

FOREIGN PATENT DOCUMENTS

| | | |
|---|---|---|
| IN | 722/MUM/2001 | 7/2001 |

OTHER PUBLICATIONS

T. Coatta, "Using Objects to Distribute Configuration Management Tasks", 1993, IBM Press, p. 537-547.*

Mei, et al., "A Software Configuration Management Model for Supporting Component-Based Software Development", 2001, ACM SIGSOFT, p. 53-58.*

Zeller et al., "Unified Versioning through Feature Logic", 1997, ACM, p. 398-441.*

Conradi, et al., "Version Models for Software Configuration Management", 1998, ACM, p. 232-282.*

U.S. Appl. No. 10/059,696, Sreedhar S. Reddy et al, Priority Claim.

* cited by examiner

| Meta Meta Model | Object Properties |
|---|---|
| Meta Object | Name/Description <AstractConcrete> |
| Meta Property | Data Type (Char, Number, Binary) Size (Size of char string and number) |
| Meta Association | Forward/Revese Name Source/Destionation Option Source/Destination Cardinality Owner of Association |

*Fig. 5A*

| Meta Meta Model Associations | Cardinality |
|---|---|
| Meta Object Inherits from Meta Object | Many to Many; Optional |
| Meta Object has Meta Property | One to Many; Optional |
| Meta Object Source of Meta Association | One to Many; Manditory |
| Meta Object Destination of Meta Association | One to Many; Manditory |

*Fig. 5B*

METHOD AND APPARATUS FOR VERSIONING AND CONFIGURATION MANAGEMENT OF OBJECT MODELS

CROSS-REFERENCE TO RELATED APPLICATIONS

The present invention is a continuation-in-part (CIP) to a U.S. patent application Ser. No. 10/059,696 entitled "Pattern-Based Comparison and Merging of Model Versions" filed on Jan. 28, 2002, now U.S. Pat. No. 6,904,588 which claims priority to an Indian provisional patent application serial number 722/MUM/2001 filed Jul. 26, 2001. Priority to Indian patent application serial number 689/MUM/2001 is also claimed. The referenced disclosures are included herein at least by reference.

BACKGROUND OF THE INVENTION

1. Field of the Invention

The present invention is in the field of software development and pertains particularly to a method and system for versioning and configuration management of object models.

2. Description of Related Art

The worldwide software industry is gradually moving to a new paradigm of development where object modeling is moving from being just an analysis/design aid to being a more pervasive end-to-end system development tool. This new paradigm views modeling and coding on a continuum with more components being traversed from the domain of coding to the domain of modeling. This shift has been facilitated by the emergence of various modeling standards like Unified Modeling Language (UML), Meta Object Facility (MOF), Extended Markup Language (XML), and so on. There are ongoing development efforts to make such facilities semantically richer.

When modeling takes over the space of coding, it must contend with the problems of size, change, and variation just as coding does now. To manage the complexity of size, information systems are partitioned into separate modules or components that interact with each other. During system development, these components are assigned to team members who work on them in parallel using independent workspaces (configurations). These independent workspaces are then consolidated or merged into a baseline workspace through a process known as 'diff & merge'. Diff & merge essentially involves comparison of two workspaces and reconciling the differences by copying and/or deleting appropriate elements from one workspace to the other. Diff & merge is a complex process fraught with risks if not performed carefully.

Most commercial repository systems do not provide any built-in tool support for workspace level diff and merge capability. Instead, they provide object-level support for detecting conflicts when an object is checked into a baseline. In this case, a user must manually compare the two differing object versions and then manually reconcile the differences. Systems that do provide built-in support for diff and merge only do so for pre-defined, standard meta models such as UML models. It has occurred to the inventor that the process would be greatly enhanced if a tool were available that could meet certain conditions.

The inventor knows of a software tool for computing, displaying, and reconciling differences in at least two object-oriented workspaces under comparison. The system, referenced in the cross-reference section of this specification as U.S. patent application Ser. No. 10/059,696, reconciles the found differences by merging the workspaces. The system provides at least one object association graph used as a modeled template for defining the nodes and node paths involved in the difference computation, a data tree structure for displaying element hierarchy symmetrically in each of the compared workspaces, an executable function for merging the separate workspaces to reconcile the found differences, and an interactive user display window for visualizing and directing the process. The tool is characterized in that a user monitors the data structures in each workspace from the display window and executes the difference and merge operations through interaction with the data structure.

The tool solves prior-art challenges by enabling presentation of differences between parallel workspaces in a structured manner that makes semantic sense to a user wherein the presentation reflects the structure of the models compared. The tool also enables dynamic update of the difference presentation in automated fashion, as differences are reconciled during the process. Furthermore, the tool supports user-introduced models in case of an extensible repository embodiment in terms of structure specification and is based on a higher level of model abstraction.

As described further above, when modeling takes over the space of coding, problems of size, change, and variation must be dealt with as is the case with coding. For example, to manage the complexity of size, information systems are partitioned into modules (components) with well-defined interfaces. As evolution progresses with respect to a system as a whole, models created of different versions define the evolutionary changes. For example, a successful information system typically has many variants specific to various delivery platforms, geographical regions, and multiple development streams. Therefore versioning is a natural implementation of evolution and variation. Without adequate tool support, the problem of versioning and configuration management can spin out of control.

In the environment of coding, there exist several versioning and configuration management tools like source code control system (SCCS), concurrent versions system (CVS), and visual source safe (VSS) to name a few that aid in managing these problems. However, these tools are not suitable for use in an abstract modeling environment. They are based on flat file formats wherein a file is treated as a compilation of lines of text. These tools do not give much consideration for semantic entities and their relationships.

In a modeling environment there are some repository systems that provide, to some extent, support for versioning of models. However, in these systems the supported versioning model largely mimics the model used for file systems treating the system as a set of objects that can be versioned without consideration of any relationships between the objects. In practice, users are responsible for assembling related objects into meaningful configurations. These systems do not address important considerations like indication of a complete or incomplete configuration, indication of all objects present, and whether or not the objects are compatible with each other. Therefore these systems do not meet the demands posed of large software systems. It is extremely difficult for users to assemble large numbers of compatible objects into useable and complete configurations manually.

What is clearly needed is a model versioning technique and system that exploits the relationships between objects in the models and between the models themselves.

BRIEF SUMMARY OF THE INVENTION

A tool for versioning and configuration management of object models in a computing system is provided and includes a component container for grouping objects to form a component containing the objects, the objects having properties and associations; and, a configuration container for grouping the assembled components to form a configuration. Each component is assigned a version number upon creation whereupon subsequent versions, if any, of the component are derived directly or indirectly from an earlier version. The objects are accessibly isolated within the assigned component versions except for inter-component associations established between compatible ones of the objects in separate but compatible components of the configuration. The associations form the basis for assembling, managing and function of the configuration.

Object properties include intra-component associations between objects within a same component. In a preferred aspect, object ownership attributes of the inter-component associations define dependency relationships between the component versions. Also in a preferred aspect, object evolution includes object modification within a component version, object introduction to a component version, and object deletion from a component version.

In some aspects of the present invention, a configuration can include one or more sub-configurations with the constraint that any shared component among them is of the same version. In all aspects, evolution history of component versioning and subsequent configuration versioning is recorded and rendered accessible for review.

In a preferred embodiment of the present invention, compatibility between objects and component versions is automatically recognized through association identification. Likewise, incompatibility between component versions within a configuration is automatically recognized and reported during assembly.

According to another aspect of the present invention, a method is provided for assembling a complete system of interacting components using a tool, the tool including a container for component assembly and a container for configuration assembly. The method includes the steps of (a) grouping desired objects into the component container; (b) forming a component from the objects and versioning the component; (c) repeating steps (a) and (b) for all of the desired components to be included in the configuration; (d) grouping the assembled components into a configuration container; and (e) forming a configuration containing the component versions.

In one embodiment in step (b), the component is versioned as a first created component. Alternatively in step (b), the component is versioned as a derivative of an older version. In a preferred embodiment in step (b), the component assembly is tool-assisted using the associations between objects in the component. Also in a preferred embodiment in step (b), the version assigned to the component is recorded in a component version evolution history.

In a preferred embodiment in step (d), compatibility between component versions is automatically recognized through association identification. In all aspects in step (e), ownership attributes of the inter-component associations define dependency relationships between the component versions of the configuration.

In some embodiments of the present invention in step (e) the configuration can include one or more sub-configurations with the constraint that any shared component among them is of the same version. In preferred embodiments in step (e) the configuration assembly is tool-assisted using the associations between the included component versions. In these preferred embodiments in step (e), incompatibilities between component versions within a configuration are automatically recognized and reported during assembly.

BRIEF DESCRIPTION OF THE SEVERAL VIEWS OF THE DRAWINGS

FIG. 5a is a table illustrating objects of a meta meta model.

FIG. 5b is a table illustrating associations of a meta meta model.

DETAILED DESCRIPTION OF THE INVENTION

According to an embodiment of the present invention, the inventor provides a software mechanism for model version comparison that provides automated diff & merge capability with dynamic update capability. The method and apparatus of the invention is described in enabling detail below.

Figure 1:
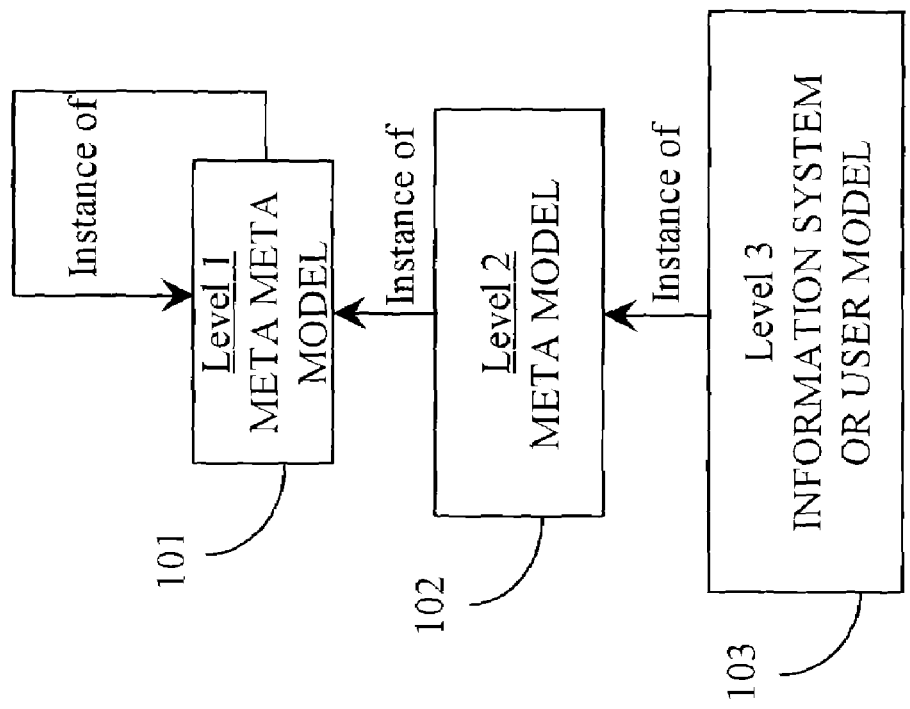
FIG. 1 is a block diagram illustrating an object-modeling framework according to an embodiment of the present invention.

FIG. 1 is a block diagram illustrating a meta-modeling framework according to an embodiment of the present invention. A meta-modeling framework is provided that defines a hierarchical structure for enabling a programmable visual user interface for diagrammatical notation and editing of abstract models. The framework of this example enables end-users to easily specify visual diagrammatic notation for modeling abstractions of a particular view of a system component introduced by them. It is noted herein that the framework of this example is mappable to a subset of Object Management Group's (OMG) meta-modeling standard meta object facility (MOF). This means that any standard meta-modeling framework that conforms to MOF can use techniques modeled in terms of the tri-layer modeling framework of this example.

The modeling framework of this example comprises 3 levels of abstraction. These are a level 1 meta meta model represented herein by a block labeled with the element number 101, a level 2 meta model represented herein by a block labeled with the element number 102, and a level 3 user model or information system model represented herein by a block labeled 103.

Meta meta model 101 is exemplified as a base or root model having the highest level of abstraction. Meta meta model 101 is the basic building block for modeling meta models. Model 101 is capable of modeling itself as illustrated by a directional arrow labeled Instance Of emanating from and then leading back in to meta meta model 101. Meta meta model 101 is, in a preferred embodiment, the root component of instantiation hierarchy of the modeling framework. Instantiation hierarchy refers to hierarchical representation of abstractions with concrete instances. Meta meta model 101 has objects, associations and properties, which will be detailed further below.

Meta model 102 is an instance of meta meta model 101 as illustrated by a directional arrow labeled Instance Of emanating from model 102 and referring back to model 101. Meta model 102 has meta objects with associated meta properties, and meta associations defined between meta objects. Meta model 102 has a lower level of abstraction than model 101 and defines the structure and semantics for implementation of the information system model and can be in one embodiment, a UML meta model.

Model 103, referred to herein as an information system model or a user model is an instance of a meta model 102 as illustrated by a directional arrow labeled Instance Of emanating from model 103 and referring back to model 102. Model 103, at the lowest level of abstraction in the framework, captures specified description of the information system modeled from various points of view as is specified by meta model 102. For example, model 103 may be a UML model of an entire banking system. It is noted herein that the modeling framework of this example is abstract enough to support UML and other standard techniques like ER-modeling. A meta-modeling framework such as the one presented in this example provides a generic modeling language for describing any standard modeling method including UML.

Figure 2:
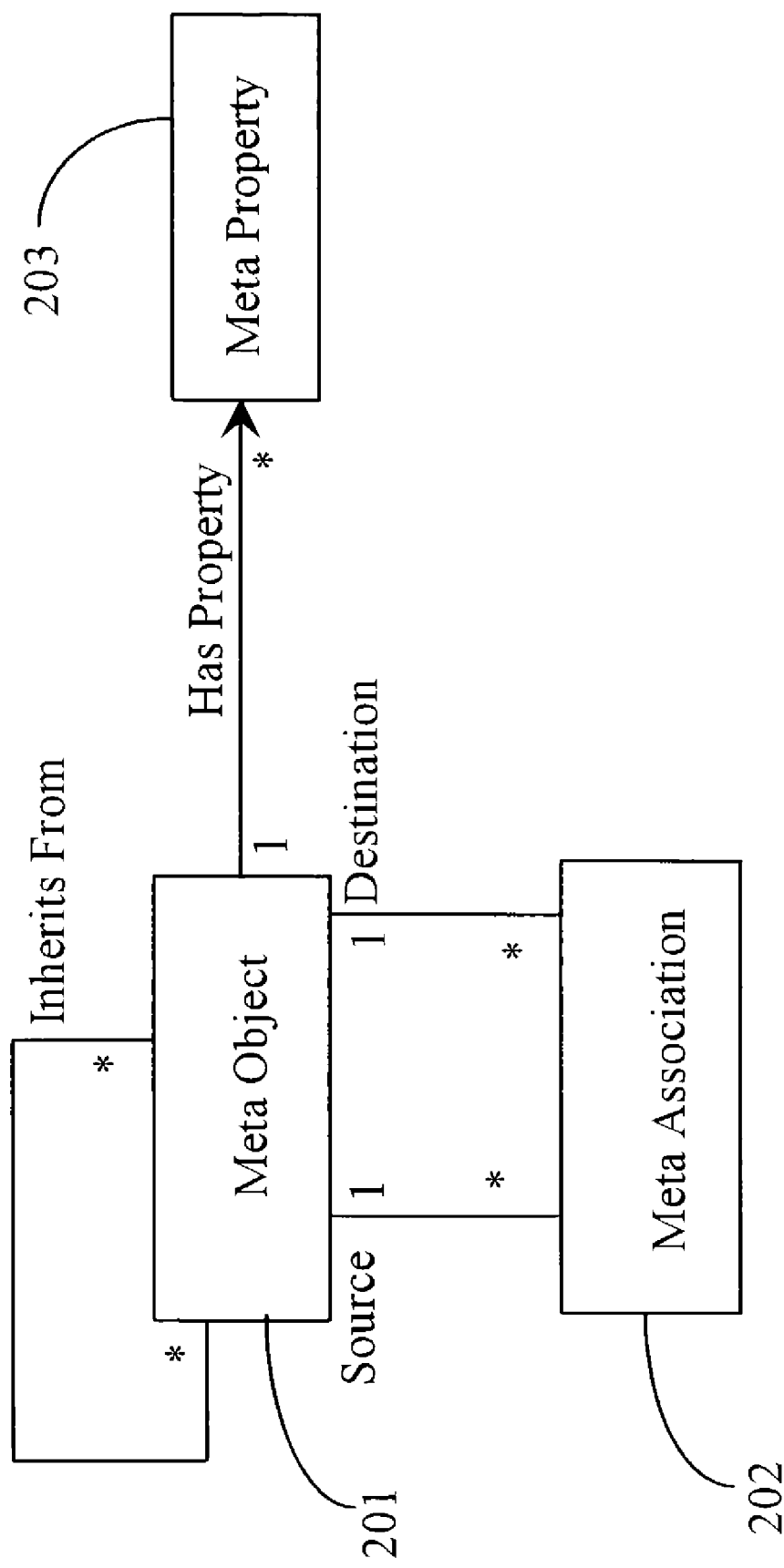
FIG. 2 is a block diagram illustrating a meta meta model according to the structure of the framework of FIG. 1.

FIG. 2 is a block diagram illustrating data structure of meta meta model 101 of FIG. 1 according to an embodiment of the present invention. Meta meta model 101 has a unique structure that supports one to one, one to many, or many to many associations. In the diagram, the notation 1 refers to one and the notation * refers to many. Default cardinality is shown in this example. In basic form meta meta model 101 has a meta object illustrated herein by a block labeled with the element number 201. Meta object 201 has a name, description, and a property (AbstractConcrete) that indicates whether the described object is an abstract object (cannot have instances) or a concrete object, which can have instances. Meta object 201 may inherit attributes from another meta object. This fact is illustrated by a connector loop labeled Inherits From with the default notation * to * meaning many to many.

Meta object 201 has a meta property object, illustrated herein by a block labeled Meta Property and given the element number 203. Meta property 203 is an object that describes a DataType (syntax). DataType includes the attributes Char (character), Number, and Binary. DataType also includes a data Size (syntax), which is equal to size of Char String and Number. A directional arrow labeled Has Property emanating from meta object 201 and progressing to meta property 203 illustrates object ownership of the meta property. Default cardinality for meta object 201 and meta property 203 is 1 to * or one to many.

Meta object 201 carries a meta association object illustrated herein as a block labeled Meta Association and given the element number 202. Meta association 202 has a forward and reverse name and a source and destination, which is optional meaning that the association is optional or mandatory for either a source object or a destination object. Meta association 202 also has a cardinality value for source and destination. The cardinality can be equal to one or more than one (many). In this example it is 1 to many (1, *). A further property of meta association 202 is the identification of the owner of the association, which can be the source object of the association or the destination object of the association.

Meta object 201 may inherit associations and properties from other meta objects as previously described above and illustrated by the connector line labeled Inherits From. This may occur on a one to many or on a many to many object basis as is shown in this example. Meta object 201 may have many meta properties 203 on a one to many basis as is shown.

It will be apparent to one with skill in the art of object modeling that this example is basic in form and is intended only to show the most basic hierarchical structure of the meta meta model. It will be appreciated that actual model structures would appear far more complex.

It will also be apparent to one with skill in the art that the meta model framework taught herein makes it very simple to extend standard modeling methods like UML with domain and/or application specific modeling abstractions. It is also possible to integrate different modeling methods by describing them as instances of a single unified meta-model.

The modeling framework and model structure presented above with respect to FIG. 1 and FIG. 2 provide a blueprint for model extension as well as symmetry with regards to diff & merge presentation data. The desire that diff & merge operations on parallel workspaces be presented in a semantic way that is understandable and user friendly is facilitated by the modeling framework and structure.

Diff & Merge

In diff & merge operations, two versions of an object are compared based primarily on object identification (ObjectIds) and secondarily in terms of their property values and associations. Comparison of two objects by themselves is not of much value unless it is performed in a context of an object's associated objects. Such a context is necessary while merging versions of an object.

In a general sense in any given model, some objects play the role of primary objects and others play the role of companion objects. For example, in an object oriented (OO) model, Class is a primary object and Attribute is a companion object. Two attributes should only be compared in the context of the Classes to which they belong. In an embodiment of the present invention, comparison and merge operations are performed according to specified object-association graphs also known as patterns. This technique obfuscates prior-art techniques of providing hard-coded comparison contexts.

In one embodiment, a simple example graph or pattern could be Class-Has-Attribute; Class-Has-Operation. Using object-association patterns, it is also possible to specify a list of the properties to be compared. In addition to providing a context for comparison and merge, a pattern also acts to limit the scope of comparison to models of interest. For example, UML has modeling elements corresponding to use-case models, object models, state chart models, and so on. If just the object models are to be compared, an object-association pattern is specified that includes only those modeling elements and associations that constitute the object model such as Class, Attribute, Operation, and the like. With an object-model pattern, the scope of comparison is limited to object models excluding all other types of models.

Figure 3:
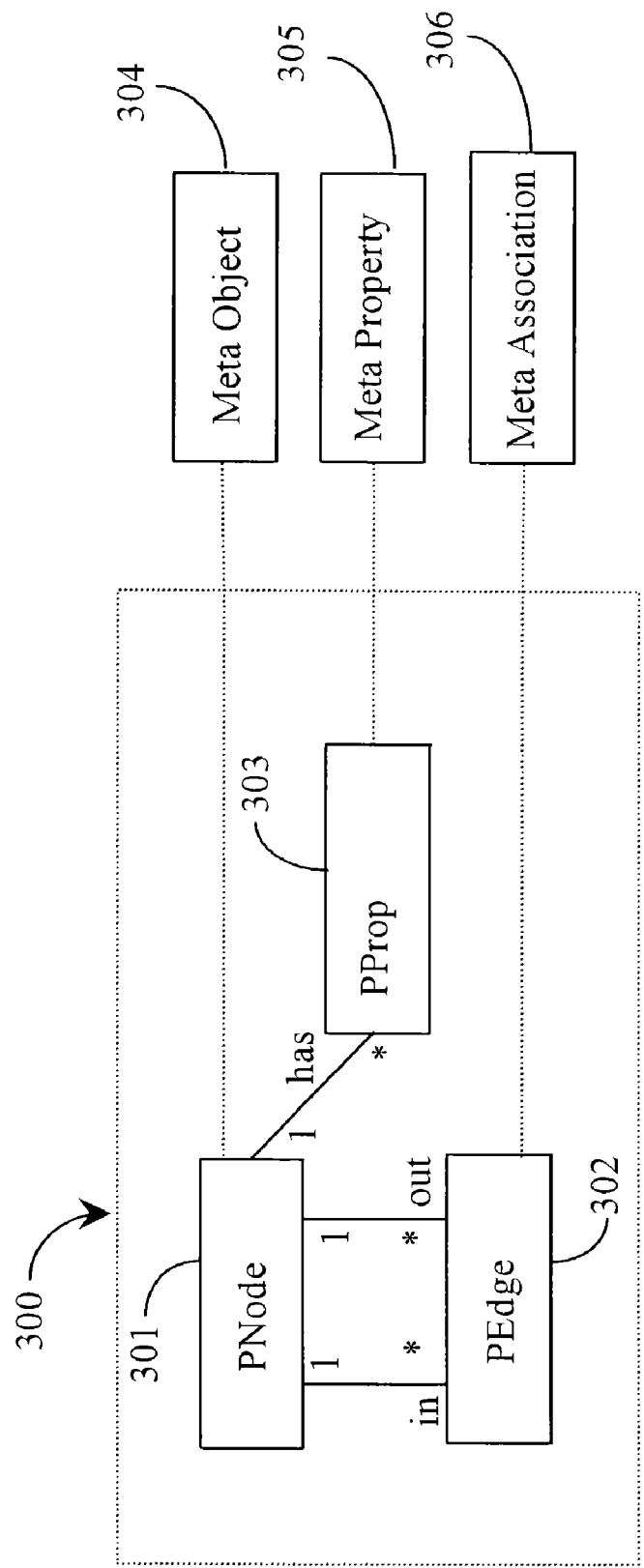
FIG. 3 is a block diagram of a pattern model for pattern-based diff and merge according to the modeling structure of the meta meta model of FIG. 2.

FIG. 3 is a block diagram of a pattern model 300 for pattern-based diff and merge according to the modeling structure of the meta meta model of FIG. 2. Pattern model 300 exhibits the unique modeling architecture described above with reference to the meta meta model of FIG. 2. That is to say that model 300 defines a view over a meta model. Therefore, model 300 is at the same level of abstraction as the meta meta model. The concept of pattern model 300 is in effect a view specification language.

Model 300 has a pattern node (PNode) 301, which maps to a meta object in a meta model, the object illustrated herein as meta object 304. Association is illustrated by a dotted line between node 301 and object 304.

Pattern model 300 has a pattern edge (PEdge) 302 associated therewith. Pattern edge 302 maps to a meta association illustrated in this example as meta association 306. The association is illustrated by a dotted line placed between edge 301 and association 306.

Pattern node 301 can specify a set of properties. A property of node 301 is illustrated herein as property (PProp) 303. The association between node 301 and property 303 is represented in this example by a solid line placed there between and labeled has meaning "node has property". The cardinality of this relationship is 1 to many (1*). Property 303 maps to a meta property illustrated in this example as meta property 305. The relationship between property 303 and meta property 305 is illustrated herein with a dotted line placed between the 2 objects.

It is noted herein that pattern node 301 can have many pattern edges 302. Some of these may be "in edges" and some of them may be "out edges" as illustrated by solid connector lines labeled in and out respectively with cardinality denoting 1 to * (many).

Pattern model 300 is the generic model for all patterns for comparison. Pattern node 301 is the model for all pattern nodes and pattern edge 302 is the model for all pattern edges. In every pattern, there is designated a root node. A root node is a pattern node that is the start node for comparison. A pattern can also have cycles. Therefore, there is no restriction that states a root node must have 0 "in edges". A pattern specifies an object-association graph.

A pattern specifies a set of model instance graphs in a workspace. Each instance graph is rooted at a model element that is an instance of the meta-object root node. This simply means that there are separate graphs describing separate models in the workspace, each model element being an instance (user model) of a meta object described in the pattern node. In practice of the present invention, model comparisons are conducted along each model-instance graph specified by a particular pattern.

Figure 4:
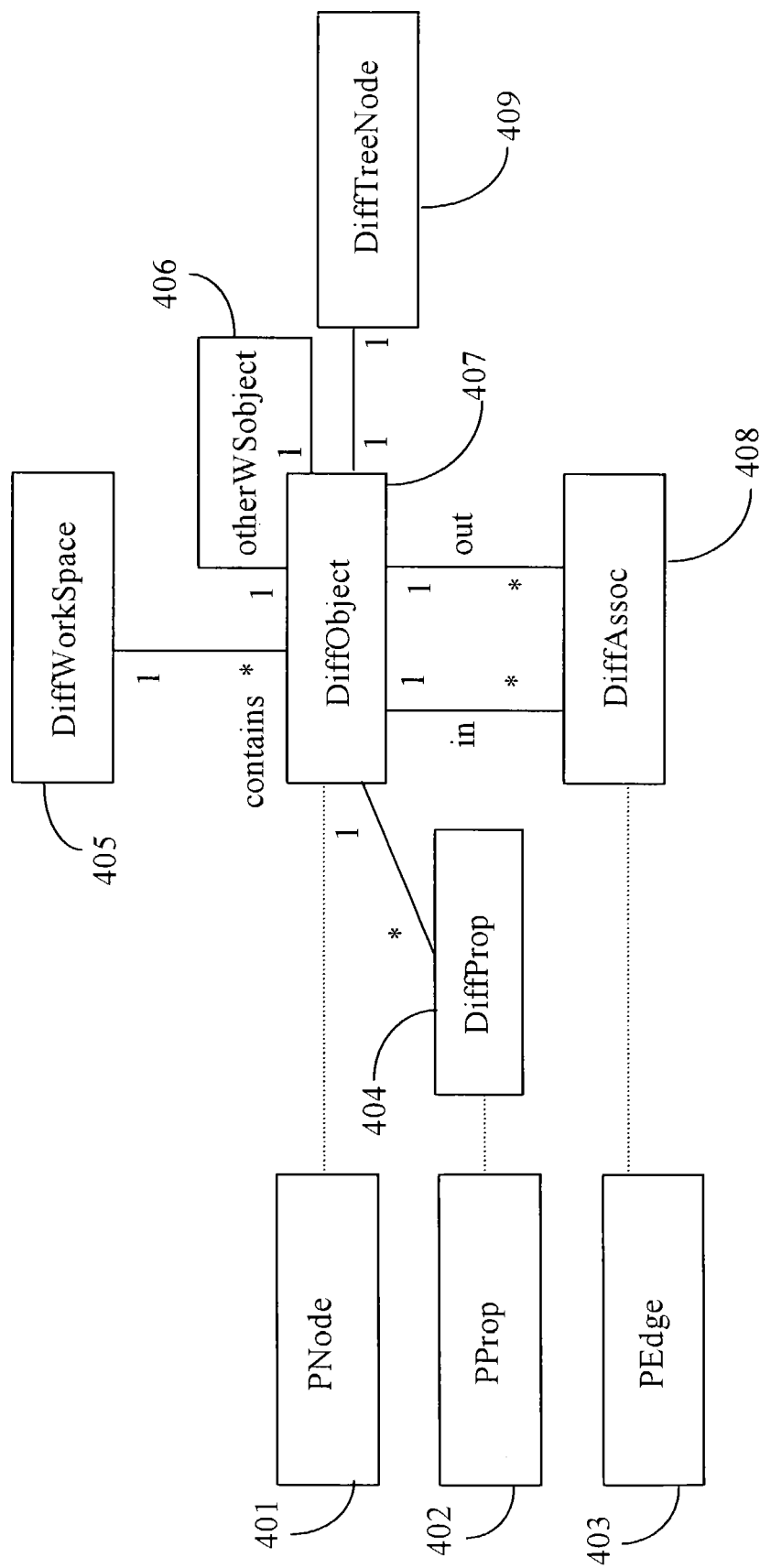
FIG. 4 is a block diagram illustrating a data structure of a difference computation according to an embodiment of the present invention.

FIG. 4 is a block diagram illustrating data structures in model form of a difference computation according to an embodiment of the present invention. An object representing a difference workspace and illustrated herein as (DiffWorkSpace) 405 is represented. DiffWorkSpace 405 is a class and is used for storing model instance graphs that are different in the workspaces being compared. DiffObject 407 is a class used for storing objects that are different in the workspaces being compared. DiffWorkSpace 405 stores pointers to root objects (DiffObjects) of model instance graphs that are different. It is noted that one class DiffWorkSpace represents objects in a source workspace and one class represents objects in a destination workspace. Duality is not represented in this particular model. One workspace 405 can contain many objects 407 as illustrated by the 1 to * notation associated with a connector line placed there between labeled contains.

It is noted in this abstract example that a difference object 407 maps to a pattern node (PNode) 401, which is analogous to the node 301 described with reference to the pattern model 300 of FIG. 3. This mapping specifies that the difference sub-tree rooted at a DiffObject corresponds to the sub-pattern rooted at the pattern node represented by the mapped PNode. Difference object 407 represents an object instance of the meta object 304 of FIG. 3 corresponding to the mapped PNode. It is also noted that a pattern property illustrated herein as (PProp) 402, a property of node 401, maps to a difference property illustrated herein as difference property (DiffProp) 404, which is a property of object 407. Pattern property 402 is analogous to property 303 of FIG. 3. It is further noted herein that a pattern edge illustrated herein as (PEdge) 302, an association of pattern node 401, maps to a difference association illustrated herein as (DiffAssoc) 408, an association of object 407. Pattern edge 403 is analogous to edge 302 of model 300 with reference to FIG. 3 above. Difference object 407 has a pointer to a corresponding workspace object of the same class in the other workspace the relationship represented herein by a connector line with 1 to 1 cardinality and labeled element number 406.

One with skill in the art of modeling will appreciate the symmetrical structure adhered to in this example of a difference data structure. It is noted that all nodes in this data structure are treated as classes in the computation as will be explained further below. A difference tree node (DiffTreeNode) 409 is provided, one for a source workspace and one for a destination workspace. Each object 407 in workspace 405 has a pointer to tree 409 and visa versa. In a preferred embodiment of the present invention difference trees are provided for comparison purposes and are GUI elements that appear in dual windows displaying compared workspaces. Difference trees facilitate dynamic updating during difference and merge computation.

In procedure, if a pattern node is part of a cycle and if the meta object instance corresponding to the pattern node already exists in the instance graph path leading to the pattern node then further traversal of the pattern graph is halted.

If a meta object instance corresponding to the pattern node does not exist in the destination workspace, then the entire instance graph rooted at the corresponding DiffObject node is marked different. In addition, the path from the root DiffObject node to the instant node is marked different.

If the object corresponding to the meta object of the pattern node exists in the destination workspace, and the node has properties to be compared and if the two objects are different in comparison of any of their properties, then the node is marked as different and the path from the root to the instant node is marked as different. If the instant node has outgoing edges then for each associated object corresponding to the meta association of the edge, the difference computation is repeated with the sub-pattern rooted at the destination node of the edge.

A difference computation according to an embodiment of the present invention is disclosed in pseudo code as follows: Note that Darray in the following classes identified in the code refers to a template of the name dynamic array class.

```
Class DiffWorkSpace
{
    Darray<DiffObject> diffObjectArr;
    int DoDiffFromSource(DiffWorkSpace *destWorkSpace, Pnode
*rootPatternNode);
    int DoDiffFromDest(DiffWorkSpace *destWorkSpace, Pnode
*rootPatternNode);
public:
    int DoDiff(DiffWorkSpace *destWorkSpace, Pnode
*rootPatternNode);
};
Class DiffObject
{
    BOOL isDummy;
    long ObjectId;
    int version;
    Pnode *patternNodePtr;
    Darray<DiffProp> propArr;
    Darray<DiffAssoc> outAssocArr;
    DiffAssoc *inAssoc;
    DiffObject *otherWSobject;
    DiffTreeNode *treeNodePtr;
public:
    int DoObjectDiff(DiffObject *destObject, Pnode *patternNode,
                Darray<DiffObject> *prevObjectArr);
    int DoAssocSrcDiff(DiffObject *destObject, Pedge *patternEdge,
                Darray<DiffObject> *prevObjectArr);
    int DoAssocDestDiff(DiffObject *destObject, Pedge *patternEdge,
Darray<DiffObject> *prevObjectArr);
}
Class DiffAssoc
{
    Pedge *patternEdgePtr;
    DiffObject *inObject;
    Darray<DiffObject> outObjectArr;
}
Class DiffProp
{
    Pprop *patternPropPtr;
    char *value;
}
Class DiffTreeNode
{
    DiffObject *diffObjectPtr;
    Darray<DiffTreeNode> childrenOfTheNode;
}
```

In the pseudo code above, DiffWorkSpace is used for storing 'difference' objects contained in a workspace as described further above with reference to the description of FIG. 4. There are two such instances, one for source workspace and one for destination workspace.

DiffObject stores an object that is different. It stores a pointer to pattern node, a pointer to incoming DiffAssoc object (for non-root objects), an array of pointers to outgoing DiffAssoc objects (for non-leaf objects), and a pointer to its counter part object in the other workspace. It also has a pointer to a tree node corresponding to the difference display window (explained in more detail later in this specification).

Class DiffTreeNode represents a tree node in the difference display window. DiffTreeNode has a pointer to the corresponding DiffObject. In the case that objects exist in one work space but not in the other, dummy nodes are created for DiffTree purposes to maintain symmetry between workspaces. IsDummy under Class DiffObject is a flag to indicate a dummy node. long ObjectId under the same section described above is an object identification (ObjectId) and version number that uniquely identifies the object and version.

DiffObject otherWSobject under the class DiffObject is a pointer to the corresponding object in the other workspace. Under class DiffProp, char*value is property value.

Algorithm for Difference Computation

According to a preferred embodiment of the present invention, the difference computation performed in the process described above is facilitated by the following algorithm expressed in pseudo code. The algorithm is for DiffWorkSpace :: DoDiff( ), which is the starting method.

```
DiffWorkSpace::DoDiff(DiffWorkSpace *destWorkSpace, Pnode
*rootPatternNode)
{
DoDiffFromSource(destWorkSpace, rootPatternNode);
    destWorkSpace->DoDiffFromDest(this, rootPatternNode);
}
DiffWorkSpace::DoDiffFromSource(DiffWorkSpace *destWorkSpace,
Pnode *rootPatternNode)
{
Darray<DiffObject> prevObjectArr;
Get meta object id from the rootPatternNode.
Get the list of object instances of the meta object from the workspace.
For each object instance
{
    Instantiate a DiffObject for source
    DiffObject *srcObject = new DiffObject;
    populate srcObject with ObjectID and version info.
    instantiate a DiffObject for destination
    DiffObject *destObject = new DiffObject;
    populate destObject with ObjectID.
    Link source and destination objects
    srcObject->otherWSobject = destObject;
    destObject->otherWSobject = srcObject;
    check if the object instance exists in the destination workspace.
    if it does not exist in the destination workspace
    {
        destObject->isDummy = TRUE;
        insert srcObject into this workspace's diffObjectArr.
        insert destWorkSpace's diffObjectArr.
    }
    else
    {
        int diffStatus;
        diffStatus = srcObject->DoObjectDiff(destObject,
rootPatternNode, prevObjArr);
        if (diffStatus == DIFFERENT)
        {
            insert srcObject into this workspace's diffObjectArr.
            insert destWorkSpace's diffObjectArr.
        }
    }
}
}
DiffWorkSpace::DoDiffFromDest(DiffWorkSpace *destWorkSpace,
Pnode *rootPatternNode)
{}
int DiffObject::DoObjectDiff(DiffObject *destObject,
Pnode *patternNode,
Darray<DiffObject> *prevObjectArr)
{
    int diffStatus = SAME;
    if this object and destObject are different in properties
    {
        diffStatus = DIFFERENT;
    }
    For each outgoing Pedge 'outPedge' of patternNode
    {
        int assocDiffStatus;
        assocDiffStatus = DoAssocSrcDiff(destObject, outPedge,
prevObjectArr);
        if (assocDiffStatus == DIFFERENT)
        {
            diffStatus = DIFFERENT;
        }
        if (!destObject->isDummy)
        {
            assocDiffStatus = destObject->DoAssocDestDiff(this,
outPedge, prevObjectArr);
            if (assocDiffStatus == DIFFERENT)
            {
                diffStatus = DIFFERENT;
```

-continued

```
            }
        }
    }
    return diffStatus;
}
int DiffObject::DoAssocSrcDiff(DiffObject *destObject,
Pedge *patternEdge, Darray<DiffObject> *prevObjectArr)
{
    int diffStatus = SAME;
    Get meta association represented by patternEdge.
For each object associated with this object in source workspace
    {
        if patternEdge is part of a cycle
        {
            if associated object already exists in prevObjectArr
            {
                continue;
            }
            insert associated object into prevObjectArr;
        }
        instantiate a DiffObject for source
        DiffObject *srcAssocObject = new DiffObject;
        populate srcAssocObject with ObjectID and version info.
        instantiate a DiffObject for destination
        DiffObject *destAssocObject = new DiffObject;
        populate destAssocObject with ObjectID.
        Link source and destination objects
        srcAssocObject->otherWSobject = destAssocObject;
        destAssocObject->otherWSobject = srcAsocObject;
        Check if destObject has a corresponding associated object in
destination workspace
        if corresponding associated object does not exist in destination
workspace
        {
            destAssocObject->isDummy = TRUE;
            instantiate DiffAsso objects and insert them
            DiffAsso *srcDiffAsso = new DiffAsso( );
            DiffAsso *destDiffAsso = new DiffAsso( );
            insert srcDiffAsso into srcObject's outAssocArr
            srcDiffAsso->inObject = srcObject
            insert srcAssocObject into srcDiffAsso's outObjectArr
            insert destDiffAsso into destObject's outAssocArr
            destDiffAsso->inObject = destObject
            insert destAssocObject into destDiffAsso's outObjectArr
            diffStatus = DIFFERENT;
        }
        else
        {
            int assocDiffStatus;
assocDiffStatus = srcAssocObject->DoObjectDiff(destAssocObject,
 patternEdge->outPNode, prevObjectArr);
            if (assocDiffStatus == DIFFERENT)
            {
Instantiate DiffAsso objects and insert them
                DiffAsso *srcDiffAsso = new DiffAsso( );
                DiffAsso *destDiffAsso = new DiffAsso( );
                insert srcDiffAsso into srcObject's outAssocArr
                srcDiffAsso->inObject = srcObject
                insert srcAssocObject into srcDiffAsso's outObjectArr
                insert destDiffAsso into destObject's outAssocArr
                destDiffAsso->inObject = destObject
                insert destAssocObject into destDiffAsso's
                outObjectArr
                    diffStatus = DIFFERENT;
            }
        }
    }
    return diffStatus;
}
int DiffObject::DoAssocDestDiff(DiffObject *destObject,
Pedge *patternEdge,
Darray<DiffObject> *prevObjectArr)
{
}
```

The function DoDiffFromDest is very similar to the function DoDiffFromSource except for a fact that DoDiff-FromDest does not have to handle a case of an object existing in both workspaces because this case is handled in DoDiffFromSource. Likewise, the function DoAssocDest-Diff is very similar to the function DoAssocSrcDiff except for a fact that DoAssocDestDiff does not have to handle a case of an object existing in both workspaces because this case is handled by the function DoAssocSrcDiff.

The function DoAssocDestDiff is very similar to the function DoAssocSrcDiff except for a fact that DoAssocDestDiff does not have to handle a case of an associated object existing in both workspaces because this case is handled by the function DoAssocSrcDiff.

One with skill in the art will recognize that the difference computation algorithm presented immediately above computes and populates difference data structures in a symmetric manner. For example, for each DiffObject in the source workspace there has to be a corresponding DiffObject in the destination workspace. In order to maintain the symmetry of computation and population, a dummy object is generated for the workspace not containing a real object when a real object does not exist in corresponding fashion in both workspaces.

In a preferred embodiment of the invention, difference data is presented in a user display window that has a left half and a right half, each containing a tree control corresponding to the source and destination workspaces respectively. A root node in the difference tree represents the workspace. The first level tree nodes are created from diffObjectArr of DiffWorkSpace. In a preferred embodiment there are tree node pointer (treeNodePtr) members of corresponding difference objects (DiffObjects). Pointers are stored therein pointing to corresponding tree nodes. Each tree node also stores a pointer to its corresponding DiffObject. These pointers are stored in a difference object pointer (diffObjectPtr) member provided to the node. A double click cursor action on a tree node by a user operating in the window interface creates child nodes by traversing an out association array (outAssocArr) of a corresponding DiffObject.

In addition to data structures mentioned further above in this specification, there also exists a data structure adapted to maintain lists of DiffObject elements that correspond to each unique ObjectId occurring in a DiffWorkSpace. This structure is expressed in the following pseudo code:

```
Class DiffObjectList
{
    long ObjectId;
    Darray<DiffObject> diffObjectArr;
}
```

The data class defined by the structure above is adapted to store all occurrences of DiffObject elements corresponding to a given ObjectId in a DiffWorkSpace. DiffObjectList objects are, in a preferred embodiment, stored in a hash table to facilitate faster access. One hash table is provided for each workspace.

Merge Impact Propagation

A merge operation involves selecting a DiffTreeNode at a required level of tree expansion and performing a copy operation from the source workspace to the destination workspace or in reverse order. In a merge operation, object properties and associations are copied from one workspace to the other. If the copy is performed at an aggregate node, then the copy operation is performed recursively down the sub tree of that node.

The copy operation described above aggregates all modified DiffObject elements (properties, associations) into an array called mergedObjects. Following is an algorithm expressed in pseudo code for propagating the impact:

```
PropagateImpact( )
{
    For each DiffObject element in the array mergedObjects
    {
        Get the corresponding DiffObjectList element that has the same ObjectId from the hash table.
        For each srcDiffObject element (except the DiffObject of the outer loop)
            in the diffObjectArr of the DiffObjectList
        {
            destDiffObject = srcDiffObject->otherWSobject;
            delete the tree nodes corresponding to srcDiffObject and destDiffObject if they exist.
            compute difference again.
            Darray<DiffObjectArr> prevObjectArr;
            srcDiffObject->DoObjectDiff(destDiffObject, srcDiffObject->treeNodePtr, prevObjectArr);
            If the deleted tree node was a first level tree node, then recreate the node.
        }
    }
}
```

The method and apparatus of the present invention provides several advantages. First and foremost, pattern-based diff&merge capability provides intelligent structure-driven comparison and merge operations that are unavailable in prior art software tooling. Additionally, the merging capability of the present invention maintains difference presentations in a dynamically updated state as differences are reconciled. The software accomplishes this by incrementally re-computing differences of all impacted model elements. The method and apparatus of the invention increases productivity of repository implementation teams through quick implementation of a customized diff&merge tool for pre-defined meta models. Pre-packaged patterns may also be extended with model elements introduced by team members providing instant customization capabilities.

Versioning and Configuration Management

According to another aspect of the present invention a unique versioning and configuration management system is provided for versioning models and assembling them into useful configurations. The system is patterned after the tri-level meta meta model framework described further above.

Referring now to FIG. 1, the method and system of the present invention depends on a tri-level modeling framework consisting of a root model or a meta meta model 101, a level 2 model or meta model 102 and a level 3 model or user model 103 as previously described with reference to FIG. 1 of Ser. No. 10/059,696.

The framework of this example enables end-users to easily specify visual diagrammatic notation for modeling abstractions of a particular view of a system component introduced by them. It is noted herein that the framework of this example is mappable to a subset of Object Management Group's (OMG) meta-modeling standard meta object facility (MOF). This means that any standard meta-modeling framework that conforms to MOF can use techniques modeled in terms of the tri-layer modeling framework of this example. The meta-modeling framework provides a hierarchical structure for enabling a programmable visual user interface for diagrammatical notation and editing of abstract models. This framework underscores the diff and merge operations previously described above, and model versioning and configuration management, which is the goal of the present invention.

FIG. 5a is a table 500 illustrating objects and properties of meta meta model 101 of FIG. 1. Table 500 has two data columns, column 501 listing meta meta model objects, and a column 502 listing associated object properties.

Reading from top to bottom and from left to right within table 500, the object Meta Object describes the structure of the meta objects in a meta model. It specifies that a meta object has a name property, a description property, and a property to indicate if it is abstract or concrete (Abstract-Concrete). The value of the name property uniquely identifies a meta object in a meta model. The object Meta Property describes the structure of the meta properties in a meta model. It specifies that a meta property is specified in terms of a data type (character, number, binary), and a data size (the weight of the character string or number).

The object Meta Association describes the structure of the meta associations in a meta model. A meta association has properties including a forward and reverse name, a source/destination option (set as optional or mandatory association for source or destination object), a source/destination cardinality designation (one or many), and designation of owner of the association whether source object or destination object.

FIG. 5b is a table 503 illustrating possible associations of a meta meta model. Table 503 has two columns, a column 504 listing meta meta model associations and a column 505 listing cardinality rules. Reading from top to bottom and from left to right within table 503, a meta object can inherit properties and associations from another meta object with an optional cardinality of many to many. A meta object can have meta properties with an optional cardinality of one to many.

A meta association has a mandatory source meta object with cardinality many to one, and a mandatory destination meta object with cardinality many to one. Following the tri-level framework and relationship rules described with reference to FIG. 1 and FIGS. 5A and 5B, a versioning and configuration method and system is provided for performing model versioning and management of complex modeled configurations.

Figure 6:
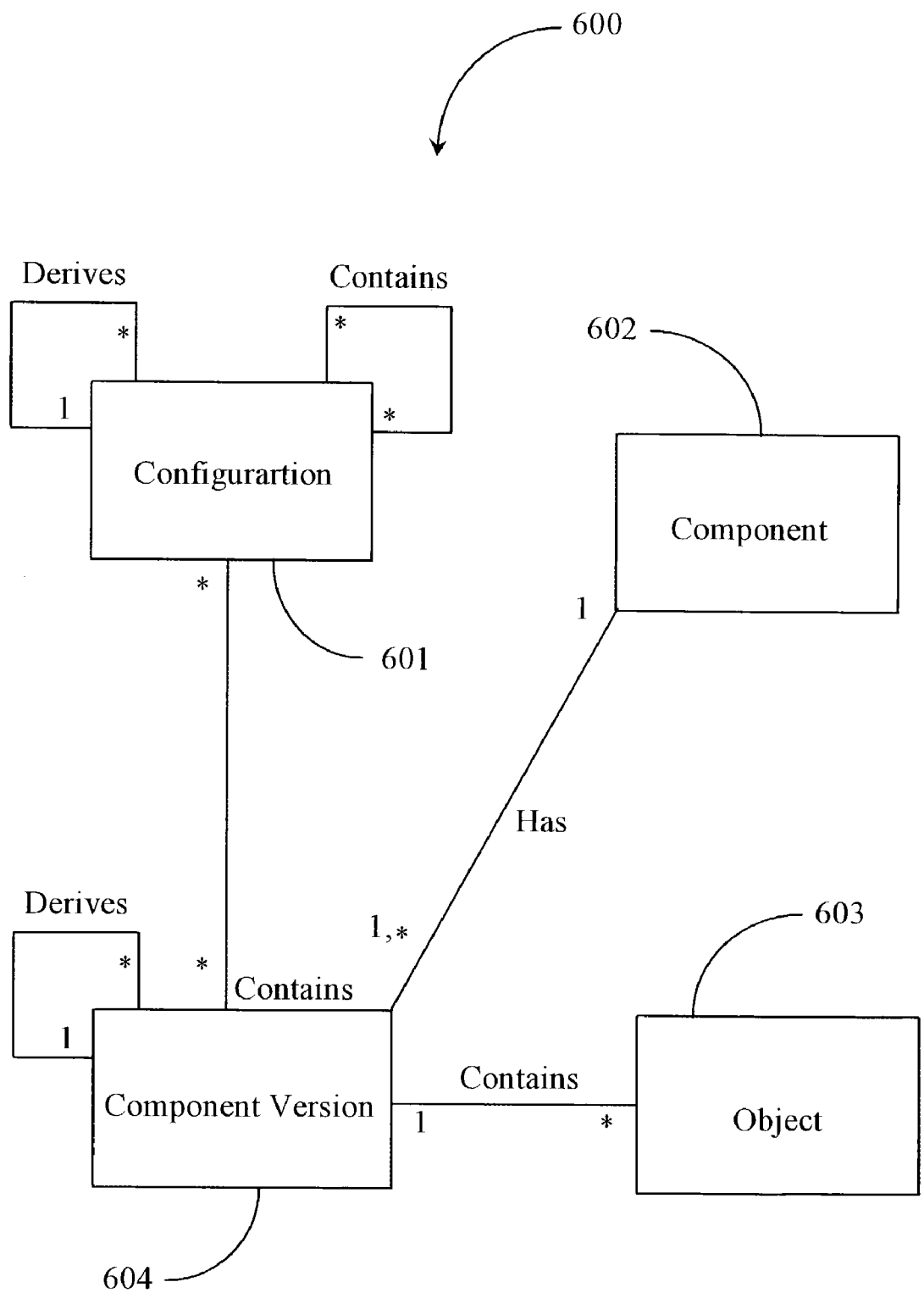
FIG. 6 is a block diagram illustrating a versioning model according to an embodiment of the present invention.

FIG. 6 is a block diagram illustrating a model 600 representing a versioning and configuration management system according to an embodiment of the present invention. Model 600 represents a system for managing models in complex configurations at the meta model or user model level of the tri-level meta meta model framework described with reference to FIG. 1 above. The term object as used herein will correspond to an object element at the user model level or at the meta model level of the tri-level framework described with reference to FIG. 1.

Information system model 600 comprises at least one configuration container (601) and at least one component (602) having at least one component version (604) containing one or more modeled objects (603). Configuration 601 can be thought of as a configuration container and may contain one or more configurations as illustrated herein by an associated loop labeled Contains with cardinality of (many to many). Configurations can be derived from another configuration as illustrated herein by an associated loop labeled Derives with cardinality (one to many).

Configuration 601 of model 600 contains at least one versioned component as described above and illustrated herein as component version 604. Cardinality is many to many in the association between configuration 601 and component version 604 of model 600 meaning that one configuration may contain many versioned components and that a single versioned component may be shared by many configurations. Configuration 601 is a container for assembling different component versions (604) of components (602). Configuration 601 represents the idea of a complete unit of work. Configuration 601 can be a product like a working banking system, an input model to a set of code generation tools, or as an input to a "make" utility.

Configuration 601 represents a complete set of compatible interacting components and provides a context for creating useable relationships between the various components by exploiting inter-component associations established between component objects, which will be described further below. Model 600 underlies a GUI-based software tool for grouping compatible objects into versioned components and then assembling the components together to form a useable configuration representing a complete information system.

Component version 604 is a version of component 602. Component 602 is a construct used to partition modules of a complex information system. In other words, each module of an information system can be mapped to one or more components analogous to component 602. A component 602 can have many versions. Cardinality between component version 604 and component 602 is many to 1. A component version belongs to only a single component, however a single component can have many component versions. Component version 604 can be derived directly or indirectly from another component version in that there may be many component versions thus derived from an original version, each version having different attributes.

Component 602 is a container for model elements like objects, properties and associations. For example, object 603 is placed in or is contained by component 602. An object upon its creation is placed in a component and carries the components identity and version number. All versioning of models is performed, in a preferred embodiment, at the component level. This is due to the observation that, in practice, an object is too finely grained for versioning.

When a component 602 is created, its first component version is automatically created. All other component versions of a same component in the model are derived directly or indirectly from the first component version and have newer version identities. Only a single version of a specific component can belong to a single configuration. However, a configuration can contain other configurations. Because a configuration is independent and considered a complete modeled entity, a configuration container can use or depend on a contained configuration but the contained configuration cannot depend on or use the container configuration. It is noted herein that a configuration can contain a plurality of compatible component versions that are not of a same component type. It is also noted herein that different versions of an object have the same object ID although they may be contained in different component versions and have the version number of the host component version. Therefore, two different versions of an object can not belong to a single component version. It is also noted herein that no two versions of an object can be contained in component versions of two different components, i.e. an object can not belong to two different components at the same time.

Configuration 601 is realized through its component versions (604). Unlike component versions, which cannot overlap, configurations can overlap and can share components. Component version 604 contains object 603 with a one to many cardinality meaning that a versioned component may contain many objects but that a single object shall not be duplicated in any single component version. These rules just described create an environment wherein configurations can share components but components are isolated themselves for change (change isolation).

It is noted herein that an object like object 603 is always viewed by the system in the context of its associated objects. Component version 604 provides a mechanism for grouping objects for the purpose of versioning as a unit of an assembled component version. When an object like object 603 is contained in a versioned component like component 604 then all of the attributes (properties) of that object are also contained in that component version.

Model 600 may exhibit associations between objects of a versioned component (intra-component association) and/or between objects contained in different components (inter-component association) of the model. For example, an object may have an intra-component association with another object in a same component version. An object may have an inter-component association with an object contained in another separate component version. In this case, the association establishes a relationship between the versioned components. The owner of an inter-component association is the object of the component that owns the association with the other object in the other component. Hence the owner of the association between the two versioned components is thus established as being one or the other component dependant on object association ownership rules. It is noted that inter-component associations can exist only within a configuration consisting of more than one separate component.

Component versioning guarantees change isolation in terms of object modification. For example, objects within a given component version can be changed wherein the changes are not visible to other versions of that component. Conceptually, a newer version of a given component contains copies of all of the objects that were within the original component.

A user employs model 600 in the form of a useable software tool supported by a graphics user interface (GUI) and a model repository to group objects into components and then version those components, which identify various system modules. Using the same tool, the user then is able to construct configurations containing the desired component versions. The configurations created are versioned according to component versions and can quickly be assembled in an automated fashion. For example, objects like object 603 are grouped into a representative component thus created. The objects are compatible and have associations and properties also recognized and exploited at the component level. The first component version is automatically created when the component is created and further component versions can then be derived from the original component version.

As components are evolved using the tool, a component hierarchical tree of successive component versions visible to a user operating a GUI is created to enable historical tracking of changes made at the component level. A new component version may contain new introduced objects that are not present in earlier versions of the component as well as objects that have been changed, for example, adding new attributes. However, the derived component version still contains all of the copies of the original component objects associations and attributes. A versioned component then contains changes to objects (functions, attributes, associations, properties) that are not recognizable or visible to other component versions containing the same original objects.

One exception to this rule is addition of new inter-component associations that, in some cases, will be established through evolution.

Once a group of system components or modules are available they are placed into a configuration container analogous to container 601 and automatically assembled leveraging their inter-component associations into a complete configuration of modules representing an information system or other planned product. Automated check procedures execute to determine if there are any missing components, associations, objects, etc. In this way a user immediately knows if the assembled configuration works or not. Incompatible components or objects within the assembled configuration are identified and isolated for consideration.

The system of the present invention can be run in parallel wherein several developers are assembling different parts of a large and complex system. The fact that versioning is performed at the component level rather than at the object level and the fact that useable inter-component associations defined at object level are automatically assembled in a user friendly GUI interface creates a much streamlined process over those available in the prior-art record.

Figure 7:
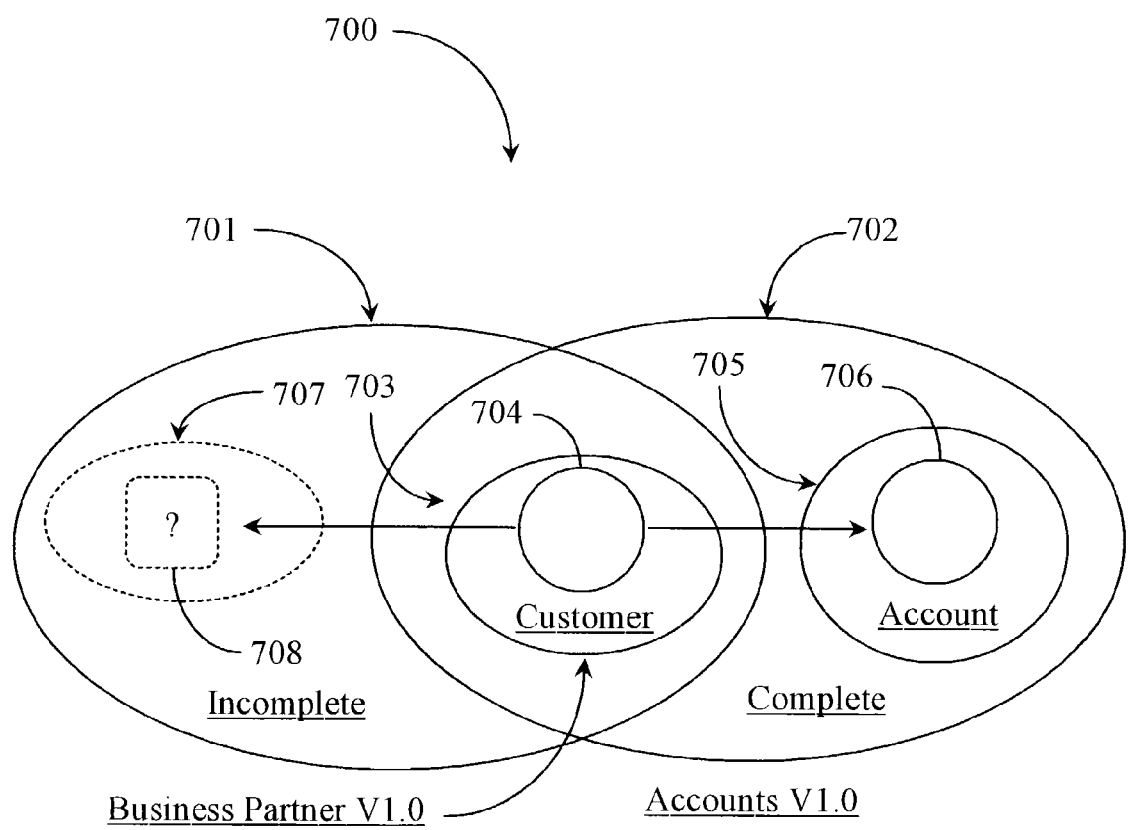
FIG. 7 is a block diagram illustrating an incomplete configuration model.

FIG. 7 is a block diagram illustrating an incomplete configuration model 700. Completeness of a configuration depends on meeting the association and component criteria of the configuration. In other words, the ownership property of defined associations helps to identify and enforce the idea of completeness of a given configuration with regard to the component versions the configuration contains.

Configuration model 700 represents an incomplete configuration implying a system or product that is not whole or does not work. Model 700 comprises an overlapping configuration consisting of a configuration of a business partner module version 1.0 or module 701, and a configuration of an account module version 1.0 or module 702. It is noted herein that configurations 701 and 702 of model 700 share a component version 703 that contains an object 704 representing a customer. Referring now to configuration 702, component version 703 has a relationship with an illustrated component version 705 containing an object illustrated herein as object 706 (account). Therefore, it can be said that customer 704 uses account 706 with the customer (object) owning the association.

In practice, the inter-component associations in a configuration establish, in this case, a consumer-supplier relationship between the existing component versions. A component version that owns an inter-component association depends on the associated component version. As far as cardinality is concerned, there may be more than one account object used by a single customer 704 and there may be more than one customer 704 that is authorized to use one account 706. One with skill in the art will recognize the benefits of association in creating various business relationships between component objects that may be represented. Accounts configuration version 1.0 is complete and works in association.

On the other hand, the owner object of the association hence, its container component of the association is deemed incomplete without the associated object and its container component. Therefore, a configuration is complete only if it contains a complete set of related component versions that satisfy all the object-owned inter-component associations within the context of the entire configuration.

Referring now to configuration 701, there is no useable relationship established within Business Partner version 1.0 to the shared customer component 703. The non-existence of a compatible object—either due to the non-existence of a version of the component or due to the non-existence of the required object in a component version is shown as a dashed object 708 contained in a dashed component 707. Therefore, object 704 cannot interact with any known objects of configuration 701. Therefore configuration 701 is deemed an incomplete configuration. In order to create a configuration consisting of 2 component versions that interact with each other, the configuration must contain all the necessary objects (in its component versions) so that all the valid inter-component associations between objects can be established in the configuration.

Figure 8:
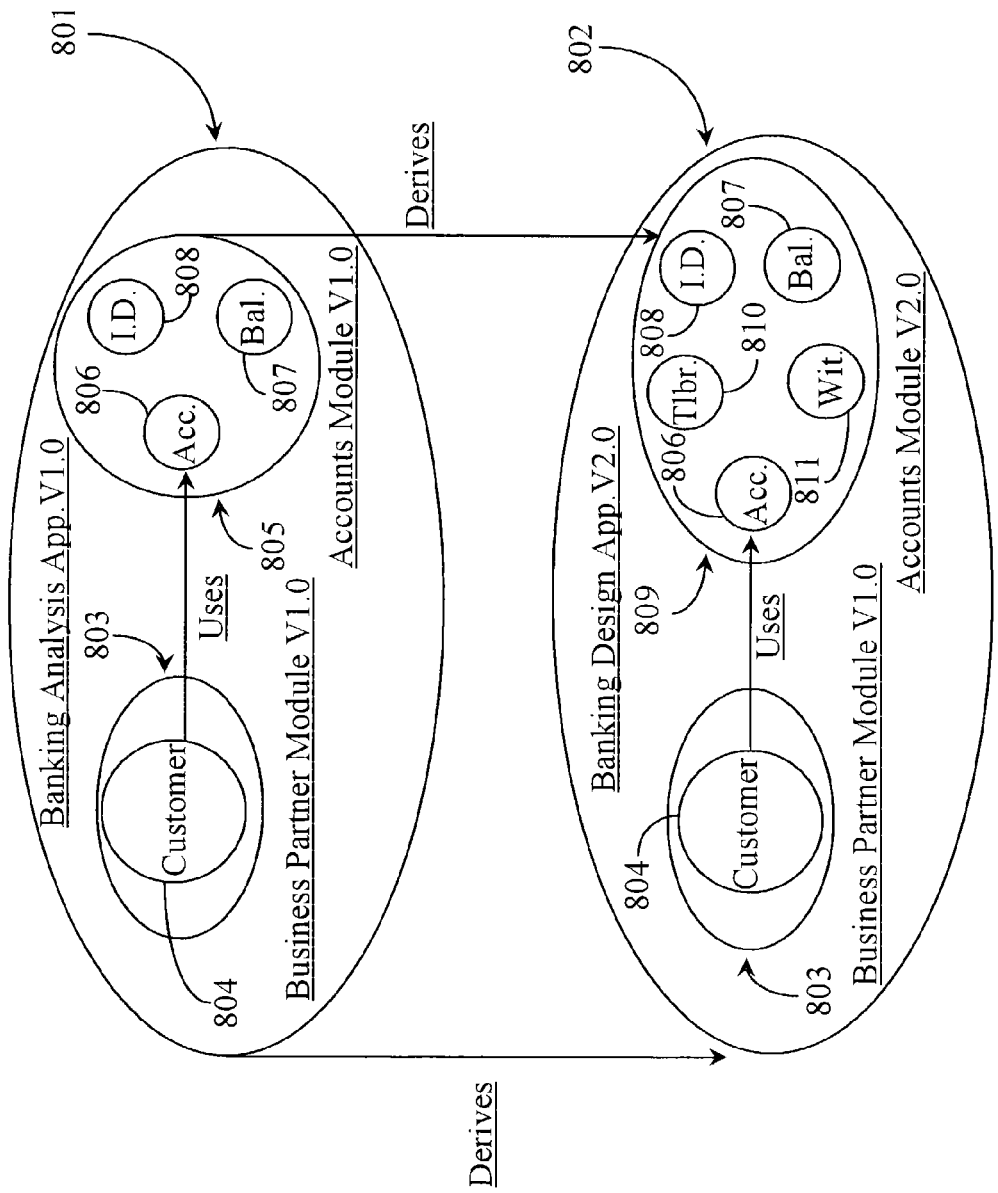
FIG. 8 is a block diagram illustrating a complete configuration model.

FIG. 8 is a block diagram illustrating two configuration versions 801 and 802 according to an embodiment of the present invention. Configuration model 801 is that of a banking application analysis version 1.0. Model 801 has two system modules or versioned components given the element numbers 803, and 805. Component 803 is a business partner module version 1.0 containing a customer object 804. Component 805 is an account module version 1.0 containing an object account (Acc.) 806. Account object 806 carries the same version number as component 805. Object 806 has two illustrated object attributes balance (Bal.) 807 and account identification (I.D.) 808. An inter-component association exists between component 803 and 805 "Customer uses account". Intra-component associations within module 805 are assumed present but not illustrated. For example, associations would be present between objects 806 and 807, and between 806 and 808. For example, a customer accesses account, selects account I.D. and accesses balance.

A GUI-based version tracking facility provides support for tracking the history of changes to the components, branch versioning, and selection of different versions of different components to form a meaningful configuration, and 'diff and merge' of models contained in different versions of components. For example, configuration 802 is a banking design application version 2.0. Configuration 802 is, in effect, derived from configuration 801 through component versioning. Configuration 802 has an account module or component 809 that is a version 2.0 component. Component 809 is derived from component 805 through introduction of new attributes. For example, component 809 has the objects of component 805 plus an added object table (Tbl.) 810, and an added operation withdraw (Wit.) 811.

The addition of the attributes 810 and 811 leads to new intra-component associations within component 809. Configuration 802 also has a business partner module or component version that is not changed from component 803 and therefore shall retain the same element number. Customer object 804 is contained within component 803. The inter-component association between component 803 and component 809 has not changed as a result of the objects added to component 809. However, new intra-component associations are assumed present within module 809. Hence, it can be said that configuration 801 and configuration 802 share a common version 1.0 component (803). The fact that it occurs in a later configuration unchanged simply indicates that both configurations (801, 802) can use a same component version. The assignment of version 2.0 to configuration 802 stems from object-level modifications to component 805 of configuration 801, which resulted in a derived component 809 with added functionality. An object tree graph can be used to display a version history graph or tree at the level of configuration or at the level of component.

Component Compatibility

Inter-component associations provide a mechanism to establish and enforce compatibility semantics between two component versions. A version of an object can replace another version of the object in an association. Hence, two versions of an object are, by default, deemed compatible. An object is shared if its component version is shared in more than one configuration. Such a shared object must appear the same, with respect to its properties and owned-associations in all the sharing configurations in which it is present. Changes made to a shared object within a configuration must be replicated in all of the sharing configurations. Moreover, addition and deletion of owned-associations to a shared object must be possible in all the sharing configurations.

Referring now back to the example of FIG. 7 above, configuration 701 illustrated an invalid sharing condition for class Customer (704) in the shared component Business Partner V1.0 (703). A default rule is followed according to a preferred embodiment that reads as follows:

A set of component versions are deemed compatible if they can be put together in a configuration without causing any sharing condition violation with respect to inter-component associations.

The notion of component compatibility is based on the premise that two versions of an object are compatible with each other. This notion of compatibility is designed to allow maximum possible flexibility in component composition by enforcing only the minimum required constraints.

Figure 9:
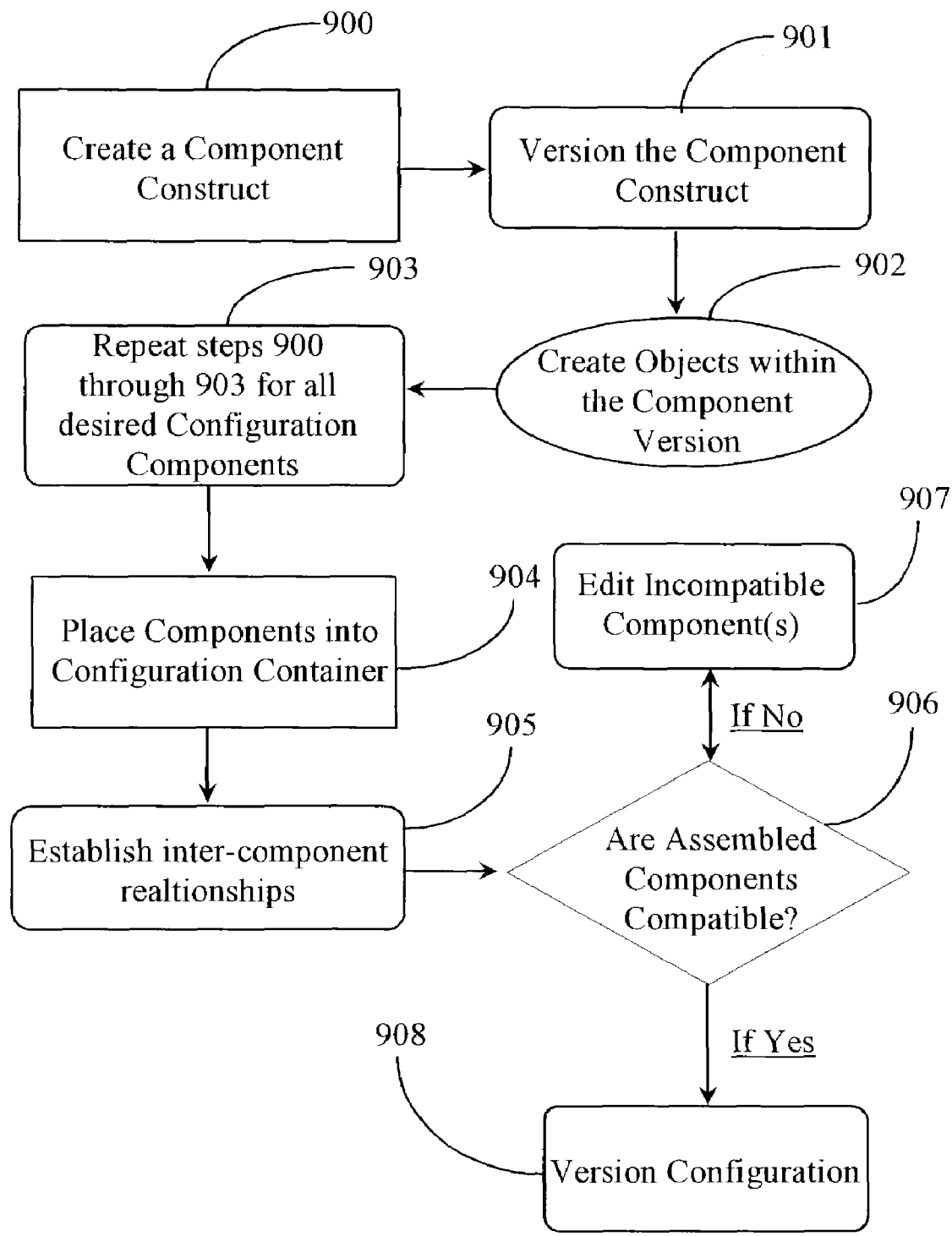
FIG. 9 is a process flow chart illustrating steps for assembling a configuration of compatible components according to an embodiment of the present invention.

FIG. 9 is a process flow chart illustrating steps for assembling a configuration of compatible components according to an embodiment of the present invention. At step 900, a user operating through a GUI interface creates a component construct. At step 901 the component construct is versioned. At step 902, the user creates objects within the component construct and establishes intra-component relationships between the objects within the component. It is noted herein that objects can only be created within a component version.

At step 903, the first three steps of the process are repeated for all of the components that will be included in a configuration. At step 904, all of the created component versions are placed in a configuration container. At step 905 the inter-components relationships between objects in the component versions in the configuration container are established. At step 906 a determination is made as to whether all of the contained component versions are compatible with respect to their inter-component relationships.

If at step 906 there are incompatibilities with respect to the inter-component relationships between one or more components, then the process resolves to step 907 wherein the targeted component or components are edited. If at step 906 it is determined that all of the inter-component relationships between the contained component versions are validated, then at step 908 the completed configuration is versioned.

It will be apparent to one with skill in the art that the process steps described above represent an abstract method for configuration assembly that is initiated at the beginning of a project and then refined through several development stages. For example, in development of a complete software system, the system is partitioned into a number of functional modules equating to components as defined herein. Hence, initial creation of components to represent the functional modules or partitions of a whole system. The entire process involves several phases, for example, an analysis phase, a design phase, a construction phase, a testing phase and a production phase. The baselines corresponding to the different phases can be modeled as configurations resulting in an analysis configuration, a design configuration, a construction configuration, a testing configuration, and so on. Step 904 may be though of as an analysis configuration container. Subsequent configurations are derived from previous configurations. For example, the design configuration is derived from the analysis configuration and within the design configuration, new component versions are derived to make design related changes.

It will also be apparent to one with skill in the process described immediately above the configuration assembly process can be run in a concurrent sequence to simultaneously create a plurality of related configurations, the whole of which, represents a complete and operable system.

The method and apparatus of the present invention may be applied to commercial model repository systems that support a variety of modeling languages and GUI interfaces. The method provides automated support for versioning of components and composing them correctly into configurations by exploiting object relationships captured in a model. The method and apparatus of the present invention should be afforded the broadest possible scope under examination. The spirit and scope of the present invention is limited only by the claims that follow.

The invention claimed is:

1. A software tool installed on and operating from a computer appliance for versioning and Configuration Management of data models in a computing system comprising:
   a modeling means in which associations are augmented with a notion of ownership;
   a component means for grouping model elements including at least objects, associations and properties; said component means having a mechanism for versioning;
   the component further having means to create a tree of component versions; with further means to support change isolation; and
   a configuration as a unit for assembling component versions providing a binding context for associations between objects contained in the assembled component versions; the configuration having means to interpret semantics of association of the ownership to determine completeness and compatibility of the assembled component versions;
   wherein interpreting the semantics at least determine if any of the associations of the ownership of any of the component versions of said configuration are unbound in the configuration.

2. The software tool of claim 1, wherein the version mechanism of the component is flexible to permit a user to include a plurality of objects as determined by the user.

3. The software tool of claim 1, wherein configuration includes means to track configuration evolution history.

4. The software tool of claim 1, in which a facility is provided to track component version evolution history.

5. The software tool of claim 1, having means to support a plurality of models and meta models.

6. A method for versioning and Configuration Management of models in a computing system comprising the steps of:
   (a) providing modeling means for augmenting associations with a notion of ownership;
   (b) providing a component means for grouping model elements including at least objects, associations and properties; said component means having a mechanism for versioning;
   (c) creating a tree of component versions further having means to support change isolation;

(d) providing a configuration as a unit for assembling component versions and providing a binding context for associations between objects contained in the assembled component versions; and (e) interpreting semantics of association ownership to determine completeness and compatibility of the assembled component versions, the interpretation of the semantics at least determining if any of the associations of the ownership of any of the component versions of said configuration are unbound in the configuration.

7. The method of claim 6, wherein the version mechanism of the component is flexible to permit a user to include a plurality of objects as determined by the user.

8. The method of claim 6, wherein the configuration includes means to track configuration evolution history.

9. The method of claim 6, in which a step is provided to track component version evolution history.

10. The method of claim 6, having means in step (a) to support a plurality of models and meta models.

* * * * *